Oct. 7, 1952     S. C. HETH     2,612,742
GRAIN COMBINE
Filed Dec. 5, 1947     2 SHEETS—SHEET 1
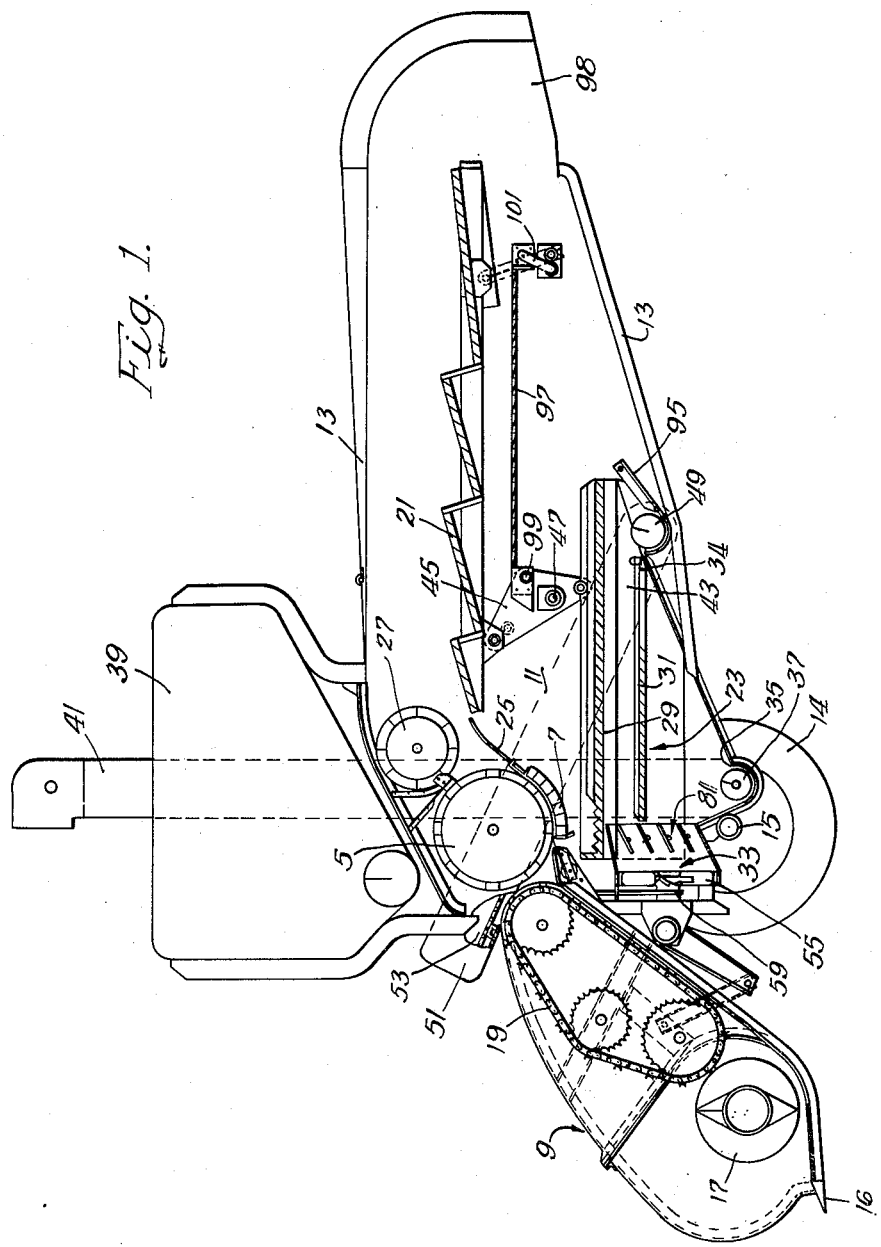
Inventor:
Sherman C. Heth
By Soans, Pond, & Anderson
Attys.

Oct. 7, 1952 — S. C. HETH — 2,612,742
GRAIN COMBINE
Filed Dec. 5, 1947 — 2 SHEETS—SHEET 2

Inventor:
Sherman C. Heth
By Soans, Pond, & Anderson
Attys.

Patented Oct. 7, 1952

2,612,742

UNITED STATES PATENT OFFICE 2,612,742

GRAIN COMBINE

Sherman C. Heth, Racine, Wis., assignor to J. I. Case Company, Racine, Wis., a corporation of Wisconsin Application December 5, 1947, Serial No. 789,814

2 Claims. (Cl. 56—124)

The present invention relates to grain separators, and in particular to an improved grain separator for use in mobile harvester-threshers or combines. Heretofore the grain separators used in combines have followed very closely the design of the grain separators provided in the old, stationary, threshing machines. The same elements have been used and these elements have been arranged or positioned in substantially the same relation to one another as in the old threshing machines. Such separators were designed for large, stationary type machines and their incorporation into a combine has resulted in structures which are unduly large, which tend to be unbalanced, and which are exceedingly difficult to maneuver in a field.

In addition to these difficulties, the use in combines of the known grain separators has a further disadvantage in that they are unable to efficiently separate weeds and weed seeds from the grain kernels. Most of the weeds growing amongst the crop in the field remain green and moist when the crop is mature and dry so that when the standing crop is harvested and threshed in one operation the moisture from the green, weed material may cause the grain to mold. Moreover, the normal back and forth movement of a combine in a field makes it impossible to keep the inlet for the blower, which supplies the air necessary to clean the grain, on the windward side of the combine at all times. During the harvesting operation when wind is in the wrong direction, the chaff and straw which are discharged from the machine are drawn into the blower inlet with the result that such unwanted material is collected with the cleaned grain.

The principal object of the present invention is the provision of an improved combine structure and especially a grain separator which overcomes the deficiencies of prior devices. A particular object of the invention is to provide a grain separator for combine type harvesters, which is compact and which is capable of efficiently cleaning threshed grain that includes weeds or other foreign materials. The accomplishment of the above objects is effected by novel structural combinations and arrangements which cooperate to produce extremely efficient grain separation. Other objects and advantages of the separator will be made apparent by the following description and the accompanying drawings.

In the drawings:

Fig. 1 is a sectional view of a combine having a grain separator in accordance with the invention;

Figure 3:
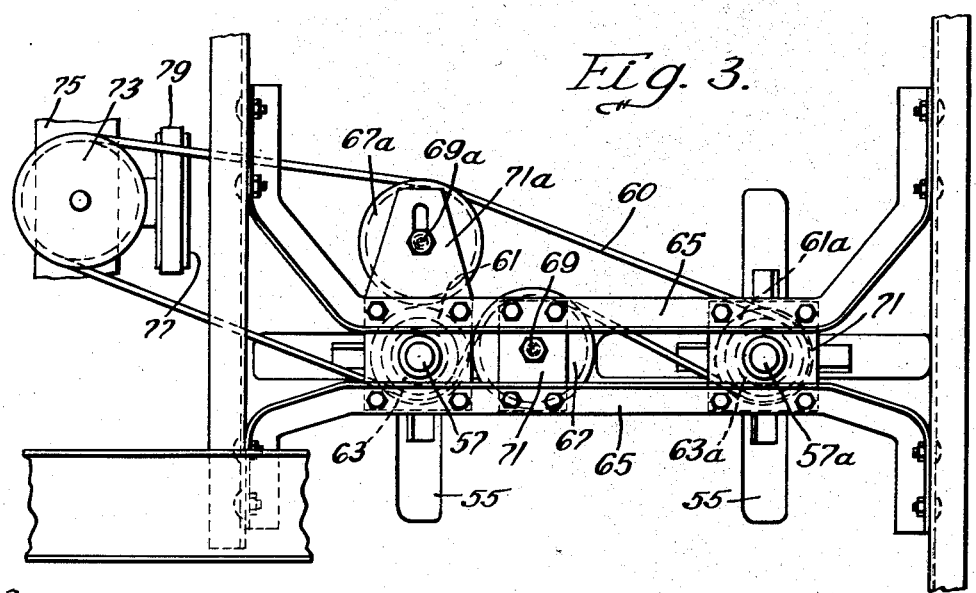
Fig. 3 is a sectional view taken on line 3—3 in Fig. 2.

The combine illustrated in the drawings is a representative, small type combine and includes a threshing cylinder 5, a set of concaves 7 which cooperate with the cylinder to remove the kernels of grain from the straw, a header 9 which cuts the standing grain and conveys it to the threshing cylinder 5, and a grain separator 11 which separates the kernels of grain from the kernels of straw and chaff. The threshing mechanism and the grain separator are enclosed in a suitable combination housing and frame 13, and a pair of support wheels 14 are journalled on an axle 15 attached to the housing 13 so that the harvester can be moved about a field in the conventional manner. The header 9 is hingedly attached to the housing 13, so as to be vertically adjustable, and includes the usual cutter bar 16, an auger 17 for conveying the grain from the cutter bar 16 to one side of the harvester, and an endless cross slat or raddle type conveyor 19 for moving the cut grain to the threshing cylinder 5.

The threshing cylinder 5 is supported within the forward end of the housing 13 adjacent the outlet end of the raddle conveyor 19. The cylinder 5 cooperatively engages the set of concaves 7 so that rotation of the cylinder 5 rubs the grain from its attached straw, and the grain and the smaller particles of chaff fall through the concaves into the separator proper 11. The separator 11 includes a straw rack 21 and a cleaning shoe 23. Straw and other large-sized materials moves upwardly and rearwardly across a pan or apron 25 onto the straw rack 21, and the finer particles of chaff and the grain fall onto the cleaning shoe 23. A star wheel or beater roll 27 is provided intermediate the threshing cylinder 5 and the straw racks 21 to facilitate the movement of the material across the apron 25.

The cleaning shoe 23 is disposed in the lower portion of the housing 13 beneath the threshing cylinder 5. The shoe 23 includes a chaffer sieve 29, a cleaning or grain sieve 31, and a set of propeller-type fans 33 for producing a blast of air for cleaning the grain. The arrangement of these elements within the housing is one of the important features of the invention.

The chaffer sieve 29 is horizontally disposed and is positioned directly below the concaves 7.

The cleaning or grain sieve 31 is also horizontally disposed, is positioned directly below the chaffer sieve 29, and is vertically spaced therefrom. The grain sieve 31 extends longitudinally of the housing and the rearward end of the sieve 31 is positioned closely adjacent the bottom member of the housing 13 to provide a substantially air tight seal between the rearward edge of the grain sieve 31 and the housing 13 as illustrated at 34 in Fig. 1.

The bottom member of the housing which is below the grain sieve 31 slopes downwardly to a discharge point 35. An auger conveyor 37 is disposed at the discharge point 35 to move cleaned grain to a storage bin 39 through a conduit 41. Each of the sieves includes the usual corrugated shutters or sieve sections whose openings are adjustable to process different types and sizes of grain. The chaffer sieve 29 and the grain sieve 31 are connected together by means of a plate 43 whose upper end is hingedly connected to a rocking link 45 which is adapted to oscillate about a pivot pin 47. The upper end of the rocking link 45 is pivotally connected to the straw rack 21. The rocking link 45 is oscillated in a suitable manner from the harvester main drive by any of the conventional power transmission means.

An air blast is directed upwardly and rearwardly through the grain sieve 31 and the chaffer sieve 29 to effect the separation of the chaff from the grain, the heavier grain falling through the sieves onto the upper surface of the bottom member of the housing 13 to the discharge point. Tailings, the materials retained between the sieves 29 and 31, are discharged from the rearward end of the sieves by a transversely extending tailings auger 49 which moves the tailings through a conduit 51 to an inlet 53 into the threshing cylinder 5 where it is reprocessed.

Figure 2:
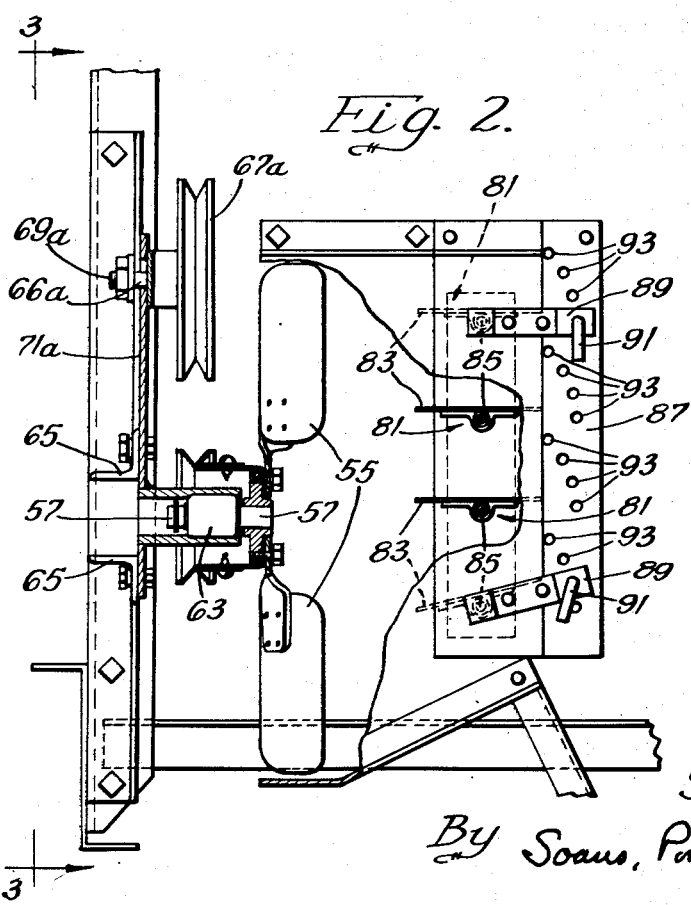
Fig. 2 is a sectional, elevational view of the fan and louver arrangement which forms an important part of the grain separator illustrated in Fig. 1.

The blast of air for the cleaning shoe is produced by a pair of laterally spaced, propeller or blade type fans 55 which are supported on shafts 57 and 57a extending longitudinally of the harvester (Fig. 2). Inlet openings 59 in the forward portion of the housing 13 are provided for the fans and, as is shown in Fig. 1, the header 9 forms a baffle for the fan inlet opening 59 which effectively prevents foreign materials from being fed thereinto.

The propeller-type fans are driven by a V-belt 60 which engages pulleys 61 and 61a keyed to the shafts 57 and 57a. As illustrated in Figs. 2 and 3, the fan shafts 57 and 57a are journalled in bearings 63 and 63a which are supported upon a pair of transversely extending angle iron members 65. In order to obtain the proper belt wrap around the pulleys 61 and 61a, a pair of idler pulleys 67 and 67a are provided along the run of the belt 60. The idler pulleys are rotatively supported on suitable gudgeons 69 and 69a which are attached to brackets 71 and 71a on the angle iron members 65. The gudgeon 69a is adjustably attached to its associated bracket 71a so that the position of the pulley 67a may be adjusted so as to provide the proper tension in the belt 60.

The V-belt 60 is driven from a pulley 73 which is connected to the harvester drive mechanism through a bevel gear pair in a gear box 75. The bevel gears are driven by a pulley 77 which has an adjustable effective diameter and which is connected to the harvester drive mechanism by a belt 79. The adjustable pulley 77 enables the operator to control the speed of the fans 55 which will then vary the intensity of the air blast in the separator.

The vertical positioning of the fans 55 in the forward end of the housing 13 and the vertical spacing of the grain sieve 31 and the chaffer sieve 29 are such that the chaffer sieve 29 is positioned above the level of the fans, and the grain sieve 31 is located below the top of the fan 55. The direction of the air blast from the fans 55 is controlled by a plurality of vertically spaced-apart shutters or directing vanes 81. The vanes 81 comprise flat plates 83 which are attached to suitable, transversely extending rods 85 journalled in suitable bearings in end plates 87 located on each side of the separator housing 13 (Fig. 2). An adjusting arm 89 is attached to one of the outer ends of each of the rods 85 and this arm is provided with a spring biased latch 91 which is selectively engagable in one of a plurality of positioning holes 93 in the plate 87. Extremely accurate control of the air blast can be maintained at all times by adjusting the relative angles between the directing vanes 81, and the optimum conditions of air flow can be maintained for any type of crop.

When operating a grain separator in accordance with the invention, various paths of air flow through the cleaning shoe may be selected and the intensity of the flow of air in each path may be accurately controlled. During normal operation, a blast of air from the lower portion of the fans 55 is directed upwardly through the grain sieve 31 and at the same time a second blast of air is directed across the upper surface of the grain sieve 31, both blasts of air then merge and flow upwardly through the chaffer sieve 29. An adjustable flap or air seal 95 is provided intermediate the rearward end of the chaffer sieve 29 and the bottom member of the housing 13 as illustrated (Fig. 1). By adjusting the flap 95 air may be bypassed around the chaffer sieve to reduce the intensity of air flowing therethrough.

The straw racks 21 are of the usual open mesh construction so that the relatively fine grain and chaff materials will fall therethrough, and the straw and other large-sized materials will be retained on the rack. The fine material which is separated from the straw on the straw rack is returned to the cleaning shoe by means of a reciprocating type feeder plate 97 which is supported on suitable guide members, beneath the rearward end of the straw rack. The straw is discharged from the straw rack through an outlet opening 98 in the rearward end of the housing 13, and the fine materials on the feeder fall onto the cleaning shoe 23 and are cleaned in the usual manner.

The reciprocating feeder plate 97 comprises an imperforate plate in which there is formed a plurality of spaced-apart ridges; reciprocation of the plate tends to move crop materials forwardly to a discharge point spaced above the sieves. The feeder plate 97 is reciprocated by the rocking link 45 and in this connection, a transversely extending pin 99 hingedly attaches the forward end of the plate 97 to the upper end of the rocking link 45. The rearward end of the feeder plate 97 is supported upon suitable pivot links 101.

The novel features of the separator of the invention cooperate to provide a compact, well balanced, harvester structure which can be easily moved about a field. In one commercial embodiment of the invention, it has been found that the overall length of the combined harvester-thresher can be reduced about 4 feet without impairing the efficiency of the separator. In addition to the reduced length of the apparatus, the propeller or blade type fans, the directing vanes, and the adjusting flap cooperate to produce air blasts which may be accurately controlled to separate grain from foreign material, as for example weeds and the like. The position of the inlet for the fans beneath the header insures that the air drawn into the fan will be clean and free from dirt, chaff, straw, etc., thereby preventing the inclusion of foreign materials with the cleaned grain. The reciprocating feeder discharges the material which is shaken from the straw racks onto the chaffer sieve in small increments so that stoppages of the sieves are obviated.

The features of my invention that are believed to be new are set forth in the appended claims.

I claim:

1. In a harvester-thresher, a threshing mechanism which includes a longitudinally extending housing containing a threshing cylinder and a cleaning shoe, and a transversely extending header for gathering the crop and for conveying the gathered crop to the threshing cylinder, the header being hingedly attached to the forward end of the longitudinally extending housing, blower means for providing a stream of air for effecting the separation of grain from foreign materials in said cleaning shoe, said blower means comprising, in combination, an air inlet opening in the forward end of said housing, said opening being located under the hingedly supported header, at least one propeller-type fan, means for supporting said fan adjacent said inlet opening in said housing to deliver a stream of air longitudinally of said housing, and means for rotating said fan, whereby the crop gathering header provides a protective baffle for the air inlet in said housing.

2. In a harvester of the type including a header portion and a thresher portion, the header portion leading directly into the thresher portion and having an upwardly and rearwardly inclined underside, an air supply for said thresher including an upright transverse wall spaced backwardly from said inclined underside of said header and having therein an opening juxtaposed to said inclined underside, an axial flow screw-type fan in said opening for delivering a stream of air rearwardly from said opening into said thresher and means for driving said fan, the space between said inclined underside and said wall being the sole means of access of air to said fan and tending to shield said fan from access to flying trash.

SHERMAN C. HETH.

REFERENCES CITED

The following references are of record in the file of this patent:

UNITED STATES PATENTS

| Number | Name | Date |
|---|---|---|
| 233,818 | Tostenson | Oct. 26, 1880 |
| 518,706 | Springer | Apr. 24, 1894 |
| 734,241 | Ramsdell | July 21, 1903 |
| 757,307 | Hill | Apr. 12, 1904 |
| 789,956 | Good | Sept. 5, 1905 |
| 1,476,660 | Tucker | Dec. 4, 1923 |
| 1,604,458 | Luedke | Oct. 26, 1926 |
| 1,764,040 | Edwards, Jr. | June 17, 1930 |
| 2,228,228 | Ferguson | Jan. 7, 1941 |
| 2,235,320 | Kilner | Mar. 18, 1941 |
| 2,305,964 | Harrison et al. | Dec. 22, 1942 |
| 2,382,965 | Appel | Aug. 21, 1945 |
| 2,395,163 | Carroll | Feb. 19, 1946 |